(12) United States Patent
Park

(10) Patent No.: US 10,836,357 B2
(45) Date of Patent: Nov. 17, 2020

(54) VEHICLE WIPER BLADE

(71) Applicants: SPARK CO. LTD., Seoul (KR); Se-Heon Park, Seoul (KR)

(72) Inventor: Se-Heon Park, Seoul (KR)

(73) Assignee: SPARK CO. LTD., Gyunggi (KR)

( * ) Notice: Subject to any disclaimer, the term of this patent is extended or adjusted under 35 U.S.C. 154(b) by 32 days.

(21) Appl. No.: 16/098,140

(22) PCT Filed: May 30, 2017

(86) PCT No.: PCT/KR2017/005622
§ 371 (c)(1),
(2) Date: Nov. 13, 2018

(87) PCT Pub. No.: WO2017/209483
PCT Pub. Date: Dec. 7, 2017

(65) Prior Publication Data
US 2019/0152443 A1      May 23, 2019

(30) Foreign Application Priority Data

Jun. 2, 2016   (KR) .................. 10-2016-0068627
Oct. 5, 2016   (KR) .................. 10-2016-0128422

(51) Int. Cl.
*B60S 1/38* (2006.01)

(52) U.S. Cl.
CPC ......... *B60S 1/38* (2013.01); *B60S 2001/3836* (2013.01); *B60S 2001/3837* (2013.01)

(58) Field of Classification Search
CPC ............... B60S 1/38; B60S 2001/3837; B60S 2001/3836; B60S 2001/3839

USPC ......... 15/250.41, 250.48, 245; D12/219, 220
See application file for complete search history.

(56) References Cited

U.S. PATENT DOCUMENTS 1,771,824 A * 7/1930 Storrie .................. B60S 1/38
                                                    15/250.4
2,090,681 A * 8/1937 Kempel ................. B60S 1/38
                                                    15/250.4

FOREIGN PATENT DOCUMENTS

| DE | 3644693 | * | 6/1988 |
| DE | 3913484 | * | 11/1989 |
| FR | 2580568 | * | 10/1986 |

OTHER PUBLICATIONS

Machine translation of description portion of German publication 3913484, published Nov. 1989. (Year: 1989).*

* cited by examiner

*Primary Examiner* — Gary K. Graham
(74) *Attorney, Agent, or Firm* — Reches Patent

(57) ABSTRACT

The present invention relates to a vehicle wiper blade having two or more edges, including: a pair of stopping parts coupled to a wiper body in such a manner as to be branched from the undersides thereof; bent parts disposed on the underside surfaces of the pair of stopping parts; and wiping parts disposed on the undersides of the bent parts to wipe a window glass surface of a vehicle, wherein the bent parts and the wiping parts are left and right symmetrical with each other around a center line of the blade, and each wiping part includes a wiping contact part disposed on the lower end thereof in such a manner as to come into contact with the window glass surface to wipe the window glass surface.

2 Claims, 8 Drawing Sheets

VEHICLE WIPER BLADE

BACKGROUND OF THE INVENTION

Field of the Invention

The present invention relates to a vehicle wiper blade, and more particularly, to a vehicle wiper blade that is provided with two edges so that one surface of the blade and one edge of the blade simultaneously come into contact with a window glass surface, thereby removing contaminants and water from the window glass surface.

Background of the Related Art

Generally, a vehicle wiper includes a wiper blade adapted to wipe a window glass surface of a vehicle and having an adapter coupling part, an arm coupled to the adapter coupling part of the wiper blade, and a linkage having one end connected to the arm and the other end connected to a motor to transfer rotary power of the motor to the wiper blade so that the wiper blade reciprocatedly moves.

In this case, the wiper blade is configured to allow wiper strips made of a generally soft rubber material to be supported against body springs, and accordingly, the wiper strips come into contact with the window glass surface by means of the pressure applied from the arm, so that as the arm swings, the wiper strips push water or contaminants on the window glass surface toward the edges of the window glass surface.

In case of vehicle wipers recently launched, a pressure of the arm has been more and more increased. Accordingly, a wiper blade having a single wide width body spring, instead of having a pair of small width body springs used in conventional practices, has been developed.

The conventional wiper blade includes the wiper strips made of soft rubber and coming into close contact with the window glass surface of a vehicle, the body spring having a curvature corresponding to the window glass surface of the vehicle in longitudinal directions thereof and elastically supporting the wiper strips thereagainst, and the adapter coupling part disposed on the center of the body spring in such a manner as to be coupled to an adapter connected to the wiper arm.

In case of the conventional wiper blade, however, the pressure applied from the wiper arm is not distributed uniformly to the wiper strips through the body spring, so that the wiper strips are not brought evenly into contact with the window glass surface.

In detail, the pressure applied from the wiper arm is collected to the center of the body spring to allow the centers of the wiper strips to be brought evenly into contact with the window glass surface, but the contact forces on both ends of each wiper strip with the window glass surface become deteriorated badly.

FIGS. 1a to 1d are sectional views showing one conventional vehicle wiper blade.

As shown, the conventional vehicle wiper blade includes fixing parts 10 and stopping parts 20 coupled to a wiper arm (not shown), and lever parts 30 from which wiping parts 50 are extendedly formed. Further, bent parts 40 are extendedly formed from the lever parts 30 in such a manner as to have smaller thicknesses than the lever parts 30 and to be deformed by means of an external force (or pressure) applied from the wiper arm.

As shown in FIG. 1a, the bent parts 40 and the wiping parts 50 in the conventional blade are disposed on vertical lines with respect to imaginary vertical lines, and as shown in FIG. 1b, the bent parts 40 are bent by means of the pressure applied from the wiper arm. As shown in FIG. 1c, the fixing parts 10, the stopping parts 20 and the lever parts 30 are inclined to a given angle in an advancing direction of the wiper arm. As shown in FIG. 1d, the wiping parts 50 coming into contact with the window glass surface of the vehicle have relatively thick arch-shaped edge portions so as to enlarge the contacted areas with the window glass surface, and in the same manner as shown in FIG. 1c, in this case, the wiping parts 50 are bent to a given angle in the advancing direction of the wiper arm.

In case of the conventional wiper blade, center lines and points of the bent parts 40 are arranged linearly to center lines of the wiping parts 50.

Like this, the conventional wiper blade moves to the same direction as the advancing direction of the wiper arm to remove water or contaminants from the window glass surface contacted therewith. In case of the double-edged wiper blade, at this time, both side wiping parts 50 are bent to the same angle as each other through the bent parts 40. If the two wiping parts 50 are bent to the same angle as each other, the same pressure is applied to both side wiping parts 50. In detail, a pressure close to ½ is applied evenly to both side wiping parts 50, and the edge portions of the wiping parts 50 moving behind in the moving direction of the blade become reduced in pressure required to remove the water from the window glass surface.

As the blade moves along the curvature of the window glass surface, further, it is inclined to an angle of about 3 to 4° as shown in FIGS. 1c and 1d. As the blade inclinedly moves, a high pressure is applied to the front side wiping part 50 in the moving direction of the blade, and a relatively lower pressure than the pressure of the front side wiping part 50 in removal of water or contaminants from the window glass surface is applied to the rear side wiping part 50, thereby failing to effectively remove the water or contaminants from the window glass surface.

SUMMARY OF THE INVENTION

Accordingly, the present invention has been made in view of the above-mentioned problems occurring in the prior art, and it is an object of the present invention to provide a vehicle wiper blade having two edges that is provided with one side wiping part makes surface contact with a window glass surface and the other side wiping part makes line contact therewith.

It is another object of the present invention to provide a vehicle wiper blade having two edges that is configured to allow a pressure applied thereto to be distributed differently to a window glass surface.

To accomplish the above-mentioned objects, according to the present invention, there is provided a vehicle wiper blade having two or more edges, including: a pair of stopping parts coupled to a wiper body in such a manner as to be branched from the undersides thereof; bent parts disposed on the underside surfaces of the pair of stopping parts; and wiping parts disposed on the undersides of the bent parts to wipe a window glass surface of a vehicle, wherein the bent parts and the wiping parts are left and right symmetrical with each other around a center line of the blade, and each wiping part includes a wiping contact part disposed on the lower end thereof in such a manner as to come into contact with the window glass surface to wipe the window glass surface, center lines of the wiping contact parts coming into contact with the window glass surface in such a manner as to be perpendicular to the window glass surface, center points of the bent parts being closer to the outside than the center lines of the wiping contact parts with respect to the center line of the blade to allow a higher pressure than a pressure applied to the front side wiping contact part to be applied to the rear side wiping contact part.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, an explanation on a vehicle wiper blade according to embodiments of the present invention will be in detail given with reference to the attached drawings.

First Embodiment

Figure 1:
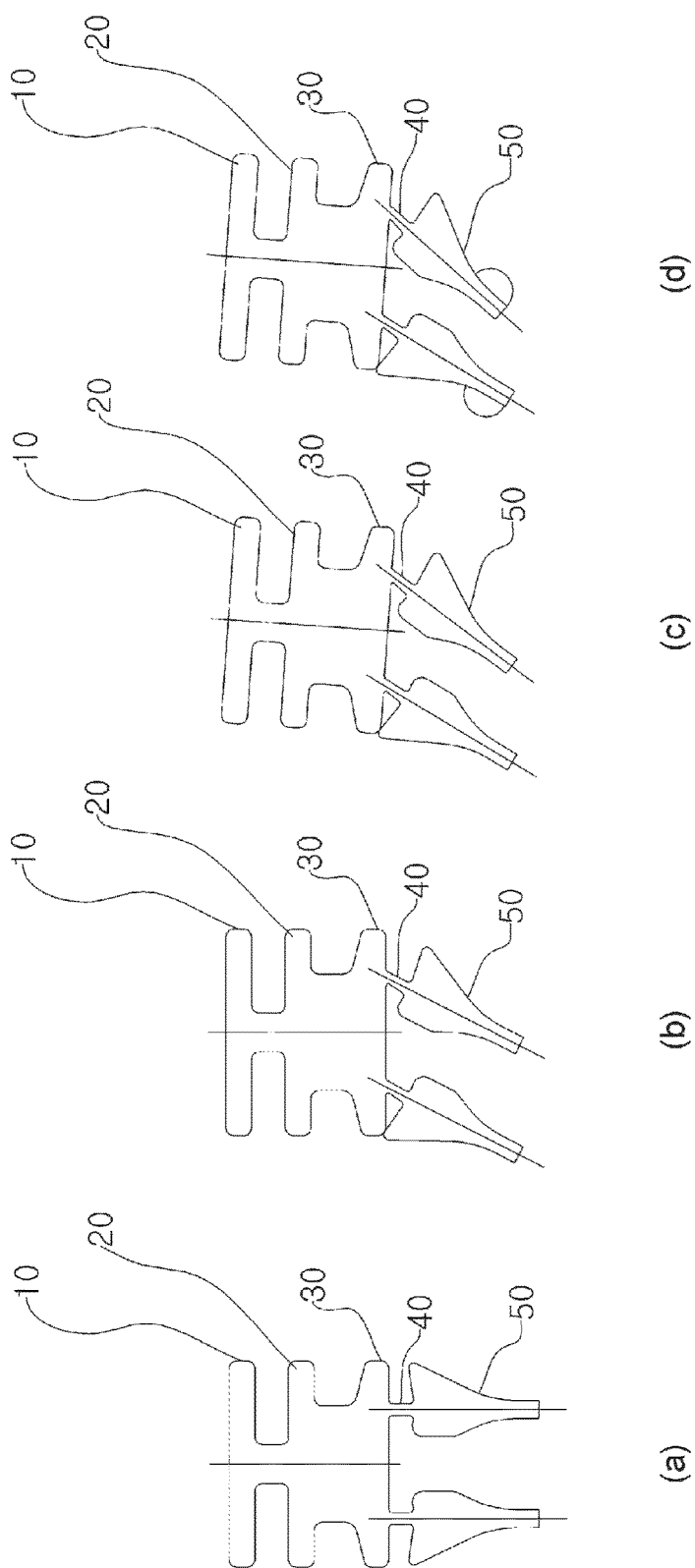
FIGS. 1a to 1d are sectional views showing a conventional vehicle wiper blade.
Figure 2:
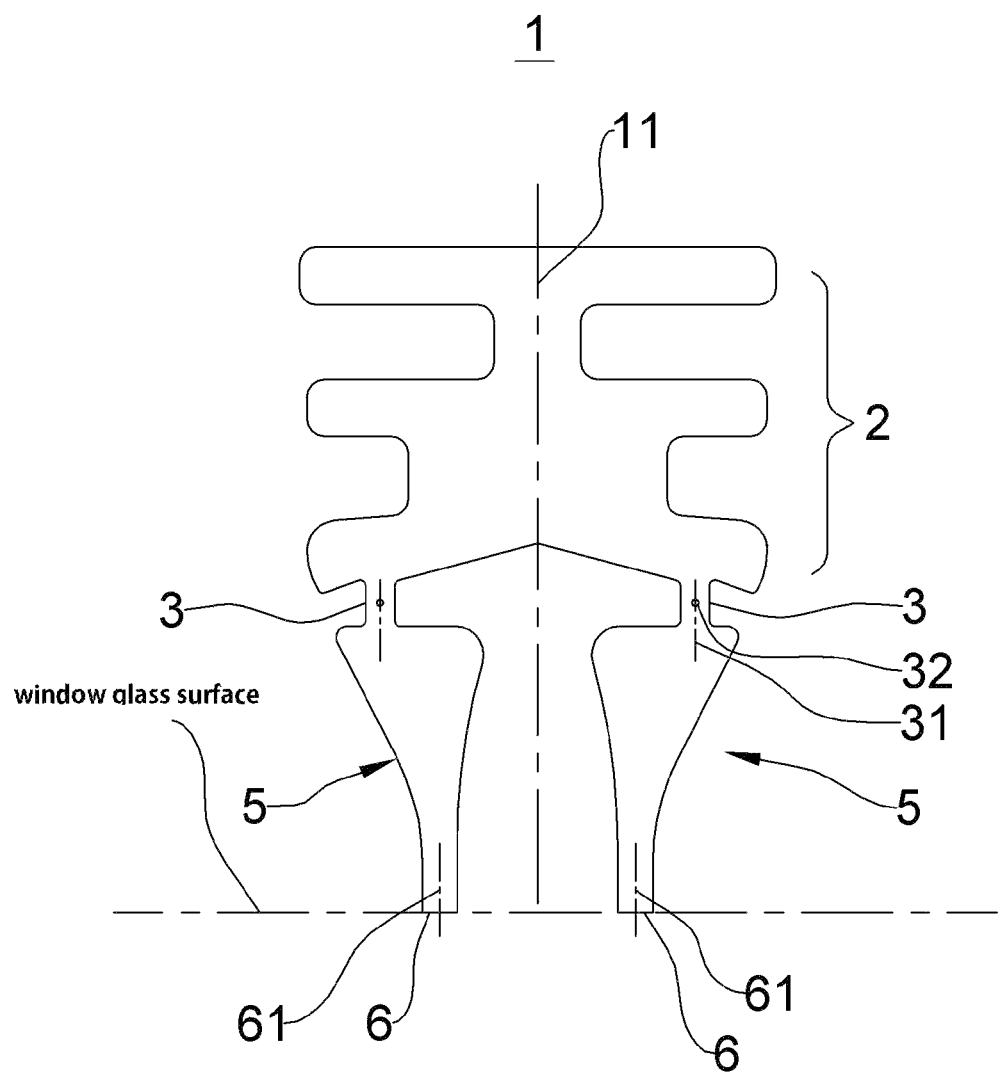
FIG. 2 is a sectional view showing a vehicle wiper blade according to a first embodiment of the present invention.

As shown in FIG. 2, a vehicle wiper blade 1 according to a first embodiment of the present invention includes stopping parts 2 disposed symmetrically with each other in such a manner as to be coupled to a wiper arm (not shown), bent parts 3 disposed on the symmetrical stopping parts 2. The bent parts 3 are extended vertically with respect to a window glass surface from the stopping parts 2, and wiping parts 5 are disposed on the undersides of the bent parts 3 to remove contaminants and water from the window glass surface. Wiping contact parts 6 are disposed on the lower ends of the wiping parts 5 in such a manner as to come into contact with the window glass surface, and the wiping contact parts 6 have given thicknesses so that they make surface contact with the window glass surface.

Thicknesses of the bent parts 3 are relatively lower than those of the stopping parts 2 and the wiping parts 5, so that the bent parts 3 can be easily deformed. In detail, the bent parts 3 are easily deformed to allow the wiping parts 5 to be kept in contact with the window glass surface, while moving in an advancing direction of the wiper arm. The bent parts 3 having given lengths are disposed between the stopping parts 2 and the wiping parts 5 in such a manner as to be connected from the stopping parts 2 to the wiping parts 5. As the bent parts 3 have the given thicknesses, they have imaginary center lines 31 formed at centers thereof, and center points 32 are located on the center lines 31 of the bent parts 3 in such a manner as to be deformed according to the pressure applied from the wiper arm.

The center points 32 are located at intermediate points in heights of the bent parts 3, and since the bent parts 3 are deformed by means of the pressure applied from the wiper arm, accordingly, it should be understood that the center points 32 are points where the bent parts 3 are most deformed.

The wiping parts 5 come into contact with the window glass surface to remove contaminants and water from the window glass surface, and the wiping contact parts 6 are disposed on the lower ends of the wiping parts 5 in such a manner as to come into contact with the window glass surface. As the wiping contact parts 6 have given thicknesses, they have imaginary center lines 61 vertical with respect to the window glass surface.

The center lines 31 of the bent parts 3 are spaced apart from each other with respect to a center line 11 of the blade 1, and also, the center lines 61 of the wiping contact parts 6 are spaced apart from each other with respect to the center line 11 of the blade 1. The center lines 31 of the bent parts 3 are closer to the outside than the center lines 61 of the wiping contact parts 6. In detail, the center lines 61 of the wiping contact parts 6 are close to the center line 11 of the blade 1, and the center lines 31 of the bent parts 3 are closer to the outside than the center lines 61 of the wiping contact parts 6.

Second Embodiment

Figure 3:
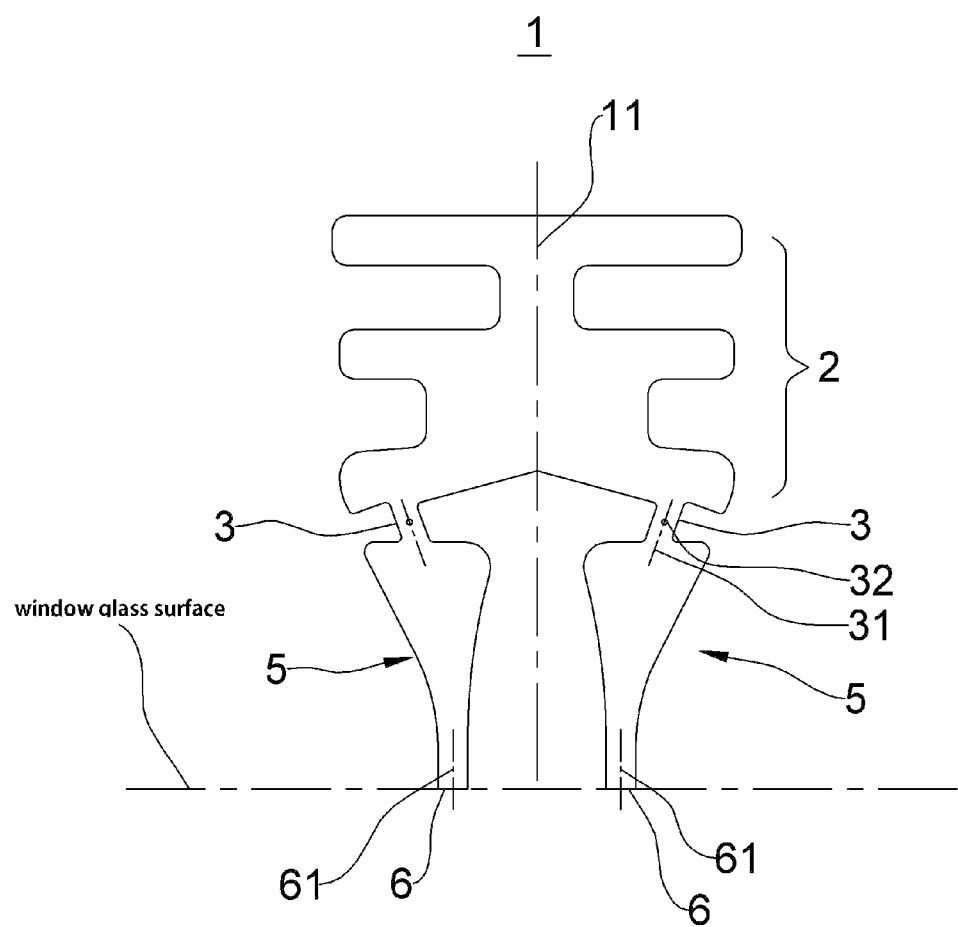
FIG. 3 is a sectional view showing a vehicle wiper blade according to a second embodiment of the present invention.

As shown in FIG. 3, stopping parts 2, bent parts 3, wiping parts 5 and wiping contact parts 6 of a vehicle wiper blade 1 according to a second embodiment of the present invention are the same as according to the first embodiment of the present invention, wherein the corresponding parts in the first and second embodiments of the present invention are indicated by corresponding reference numerals and the repeated explanation on the corresponding parts will be avoided.

The bent parts 3 are disposed between the stopping parts 2 and the wiping parts 5 in such a manner as to be inclined to a given angle. The center lines 31 of the bent parts 3 are inclined to the same angle as the bent parts 3.

The center lines 61 of the wiping contact parts 6 are vertical with respect to the window glass surface, and the center lines 31 of the bent parts 3 are inclined to the given angle with respect to the window glass surface.

The center lines 61 of the wiping contact parts 6 are relatively close to the center line 11 of the blade 1, and the center lines 31 of the bent parts 3 are more distant from the center line 11 of the blade 1. In detail, the center points 32 of the bent parts 3 are closer to the outside than the center lines 61 of the wiping contact parts 6.

Third Embodiment

Figure 4:
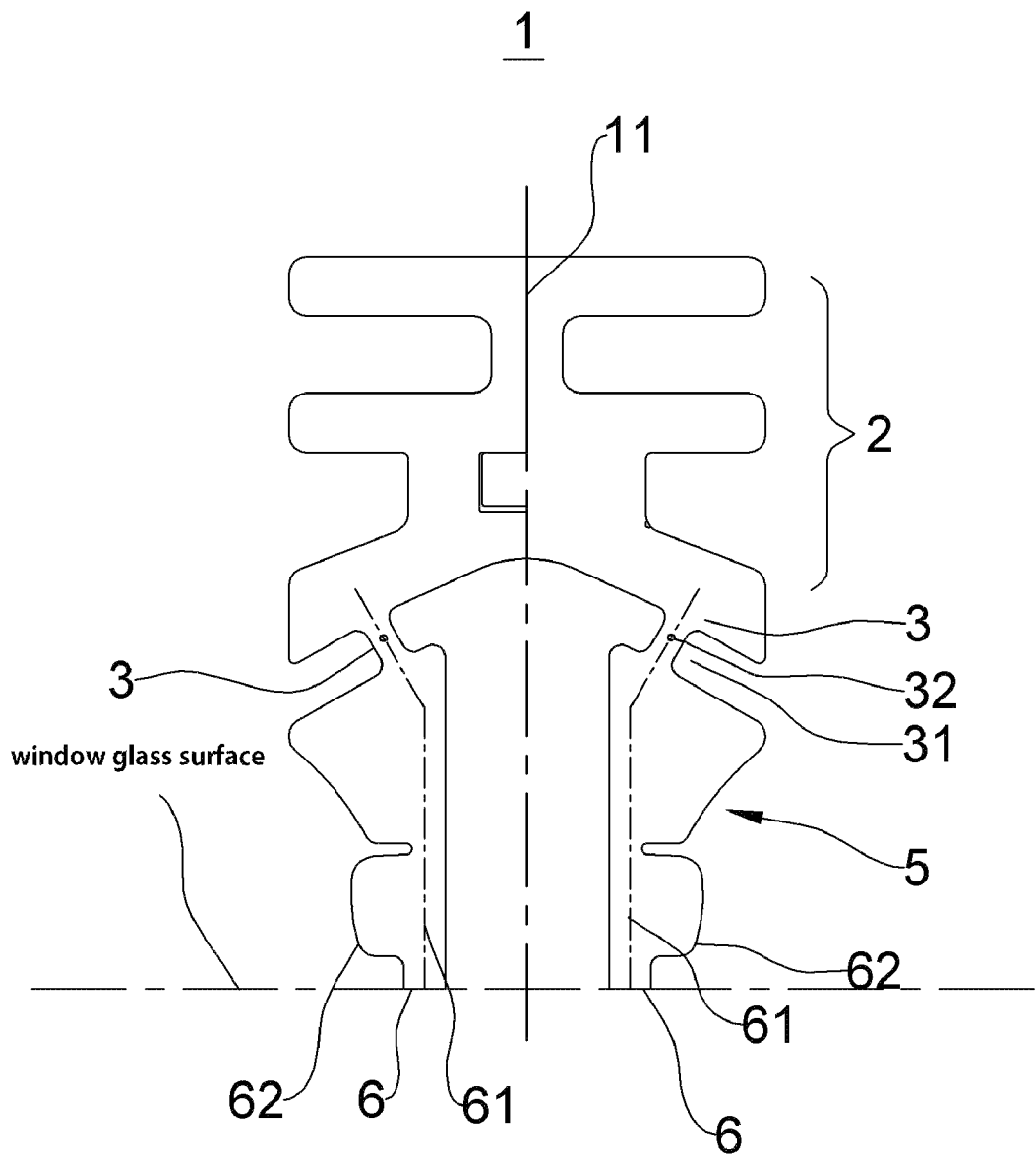
FIG. 4 is a sectional view showing a vehicle wiper blade according to a third embodiment of the present invention.

As shown in FIG. 4, a vehicle wiper blade 1 according to a third embodiment of the present invention includes stopping parts 2 disposed symmetrically with each other on an upper portion thereof, bent parts 3 disposed on the symmetrical stopping parts 2 in such a manner as to be inclined to a given angle, and wiping parts 5 disposed on the undersides of the bent parts 3.

Further, wiping contact parts 6 are disposed on the lower ends of the wiping parts 5, and the wiping contact parts 6 have center lines 61 vertical with respect to the window glass surface. The wiping contact parts 6 have window glass surface contact portions 62 protruding from the outer surfaces thereof.

According to the third embodiment of the present invention, the center lines 61 are spaced apart from each other at a relatively narrow distance, and the center lines 31 of the bent parts 3 are closer to the outside than the center lines 61 of the wiping contact parts 6.

Fourth Embodiment

Figure 6:
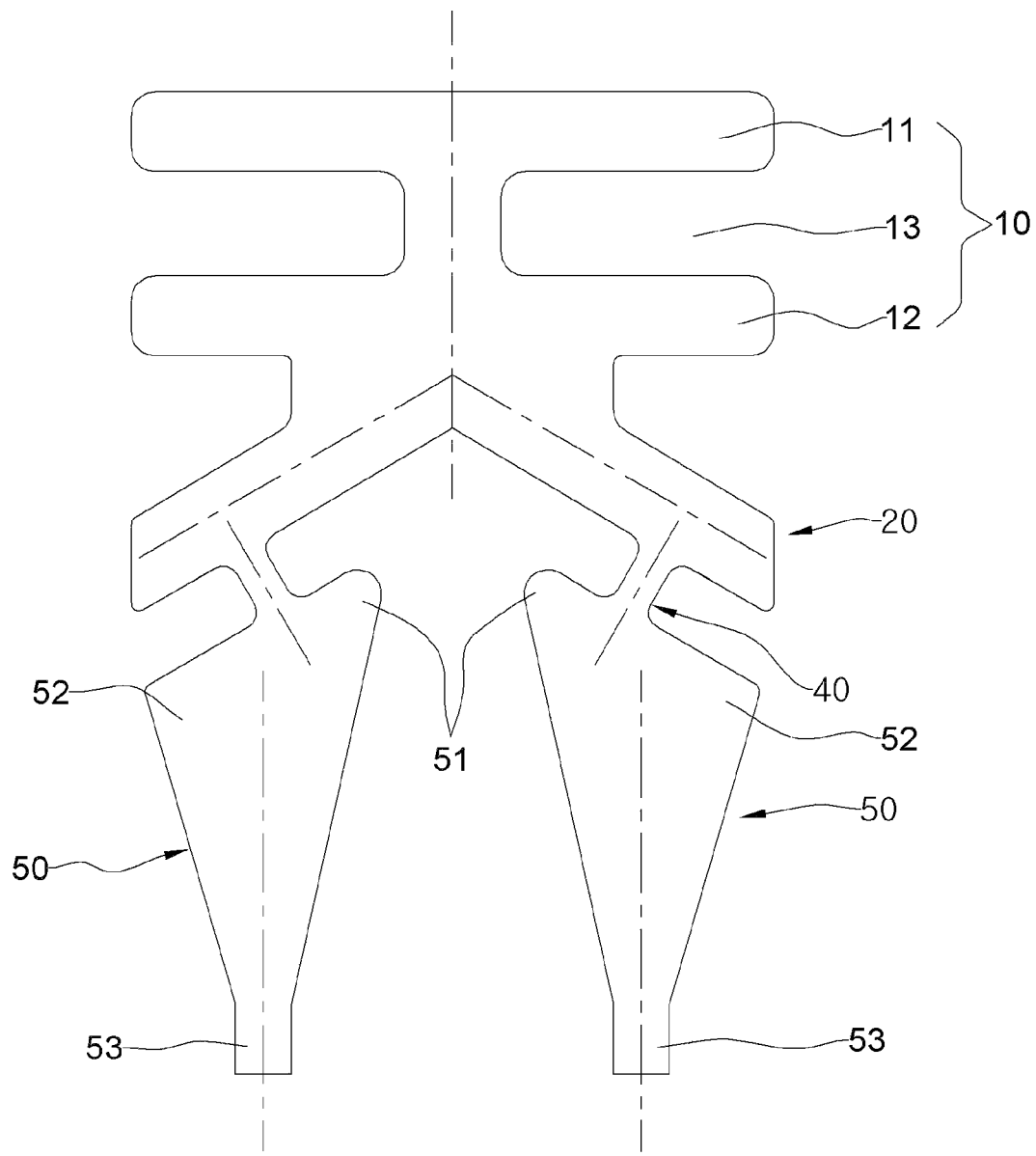
FIG. 6 is a sectional view showing a vehicle wiper blade according to a fourth embodiment of the present invention.

As shown in FIG. 6, a vehicle wiper blade according to a fourth embodiment of the present invention includes fixing parts 10 coupled to a wiper body, a pair of stopping parts 20 branched inclinedly to both sides from the undersides of the fixing parts 10, bent parts 40 disposed on the pair of stopping parts 20 in such a manner as to be bent to an opposite direction to a moving direction of a wiper arm, and wiping parts 50 disposed on the undersides of the bent parts 40 to wipe a window glass surface of a vehicle. In this case, upper end portions of the bent parts 40 are inclined to more outward direction from the center line of the blade than lower end portions of the bent parts 40, and accordingly, the bent parts 40 are deformed at different angles to allow different pressures to be applied to the wiping parts 50. The thicknesses of the bent parts 40 are lower than those of the stopping parts 20 so that the bent parts 40 can be bent (deformed) according to the movement of the wiper arm. The bent parts 40 are extended in normal directions with respect to the stopping parts 20.

The wiping parts 50 include first pressure support portions 51 supported against inner surfaces of the stopping parts 20 as the bent parts 40 are bents, second pressure support portions 52 protruding therefrom in directions symmetrical with the first pressure support portions 51 in such a manner as to be supported against outer surfaces of the stopping parts 20, and edge portions 53 formed unitarily with the first pressure support portions 51 and the second pressure support portions 52 to wipe the window glass surface. The first pressure support portions 51 are formed at the same angles as the stopping parts 20 in such a manner as to protrude inward toward the center line of the fixing parts 10, and the lengths of the first pressure support portions 51 are shorter than the protruding lengths of the second pressure support portions 52. The second pressure support portions 52 protrude toward the front ends of the stopping parts 20 in such a manner as to be supported against the outer surfaces of the stopping parts 20.

The term "inner surfaces" in the present invention indicates vertical center line directions with respect to the bent parts 40, and the term "outer surfaces" in the present invention indicates front end directions of the stopping parts 20 with respect to the bent parts 40.

The protruding lengths of the second pressure support portions 52 are longer than those of the first pressure support portions 51, and the first pressure support portions 51 and the second pressure support portions 52 are inclined to the same angles as the stopping parts 20.

The edge portions 53 are formed unitarily with the first pressure support portions 51 and the second pressure support portions 52 and come into close contact with the window glass surface of the vehicle to remove the contaminants or rainwater from the window glass surface by means of the reciprocating motion of the wiper blade.

Now, an explanation on an operating method of the vehicle wiper blade according to the present invention will be given.

According to the first to third embodiments of the present invention, the blade 1 moves in the state of coming into close contact with the window glass surface by means of the wiper arm.

The stopping parts 2 coupled to the wiper arm move to the same direction as each other, and the bent parts 3 are deformed so that they are kept in contact with the window glass surface by means of the pressure applied from the wiper arm. In detail, the bent parts 3 are deformed by means of the pressure applied from the wiper arm, and the wiping parts 5 are bent to the given angle by means of the bent parts 3. The wiping parts 5 are bent to the opposite direction to the moving direction of the wiper arm.

Figure 5:
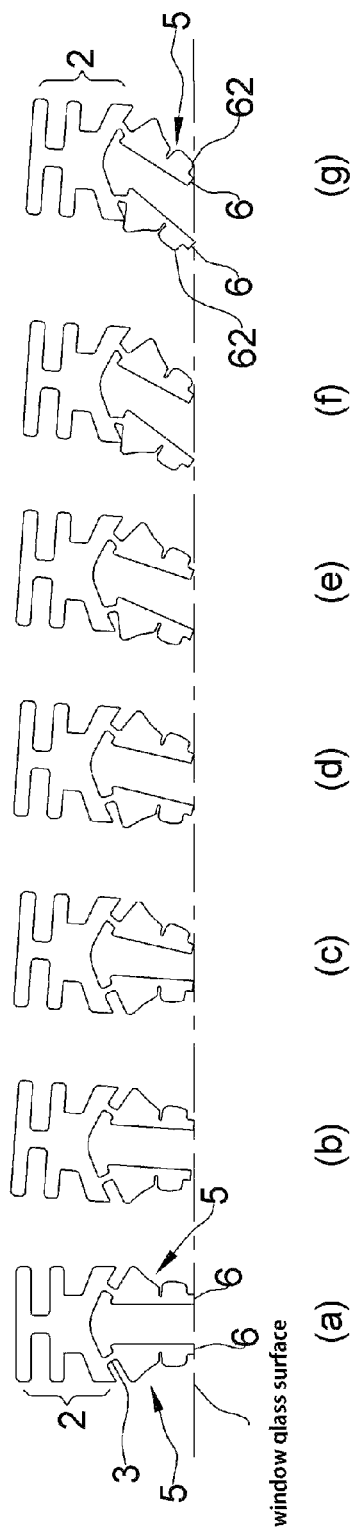
FIGS. 5a to 5g are sectional views showing sequentially deformed states of the vehicle wiper blade according to the third embodiment of the present invention in an advancing direction of the blade.

As shown in FIG. 5a, the blade 1 is kept at an almost vertical state with respect to the window glass surface and then moves in a state coming into close contact with the window glass surface, together with the wiper arm.

As shown in FIG. 5b, the stopping parts 2 are inclined to a given angle, and at this time, the bent parts 3 are also inclined to a given angle. The bent parts 3 are deformed to the given angle by means of the pressure applied from the wiper arm.

As shown in FIGS. 5c to 5e, the stopping parts 2 are gradually deformed by means of the movement of the wiper arm, and through the deformation of the bent parts 3, also, the wiping parts 5 are inclined to a given angle with respect to the window glass surface.

As shown in FIG. 5f, the bent parts 3 are deformed to different angles from each other by means of the pressure of the wiper arm. In detail, as shown, a relatively high pressure from the wiper arm is applied to the wiping part 5 on the left side, and a relatively lower pressure than the pressure of the left side wiping part 5 is applied to the wiping part 5 on the right side. Accordingly, the wiping parts 5 are deformed to different angles from each other, and also, the wiping contact parts 6 are deformed to different angles from each other.

As shown in FIG. 5f, the deformation of the bent part 3 on the right side wiping contact part 6 is larger than that of the bent part 3 on the left side wiping contact part 6, so that the window glass surface contact portion 62 of the right side wiping contact part 6 comes into close contact with the window glass surface.

As shown in FIG. 5g, the window glass surface contact portion 62 of the right side wiping contact part 6 makes surface contact with the window glass surface, and the left side wiping contact part 6 makes line contact with the window glass surface. In detail, the right side wiping contact part 6 makes surface contact with the window glass surface, and also, the left side wiping contact part 6 makes line contact with the window glass surface.

According to the present invention, like this, the blade 1 makes surface contact as well as line contact with the window glass surface. The right side wiping contact part 6, which makes surface contact with the window glass surface, removes contaminants from the window glass surface, and the left side wiping contact part 6, which makes line contact with the window glass surface, removes water from the window glass surface.

On the other hand, as shown in FIGS. 5a to 5g, if the wiper arm moves from the right side to the left side, the blade 1 is deformed in the opposite direction to the moving direction of the wiper arm to remove the contaminants and water from the window glass surface.

FIGS. 7a to 7f and FIG. 8 show the vehicle wiper blade according to the fourth embodiment of the present invention. As shown in FIGS. 7a to 7f, the wiper arm moves from the right side to the left side, and the wiping parts 50 reciprocatedly move in a state of coming into close contact with the window glass surface of the vehicle by means of the reciprocating motion of the wiper arm to thus wipe contaminants or rainwater from the window glass surface. The wiper arm reciprocatedly moves, while applying a given pressure to the wiper blade to allow the wiping parts 50 to come into close contact with the window glass surface of the vehicle, and as the fixing parts 10 move, the stopping parts 20 and the wiping parts 50 move unitarily with the fixing parts 10.

For the convenience of the description, a first bent part 40a and a second bent part 40b as the bent parts 40 are provided, and a first wiping part 50a and a second wiping part 50b as the wiping parts 50 are provided. Further, the stopping parts 20 and the first bent part 40a have an inclination angle of 'θ1', and the stopping parts 20 and the second bent part 40b have an inclination angle of 'θ2'.

Figure 7:
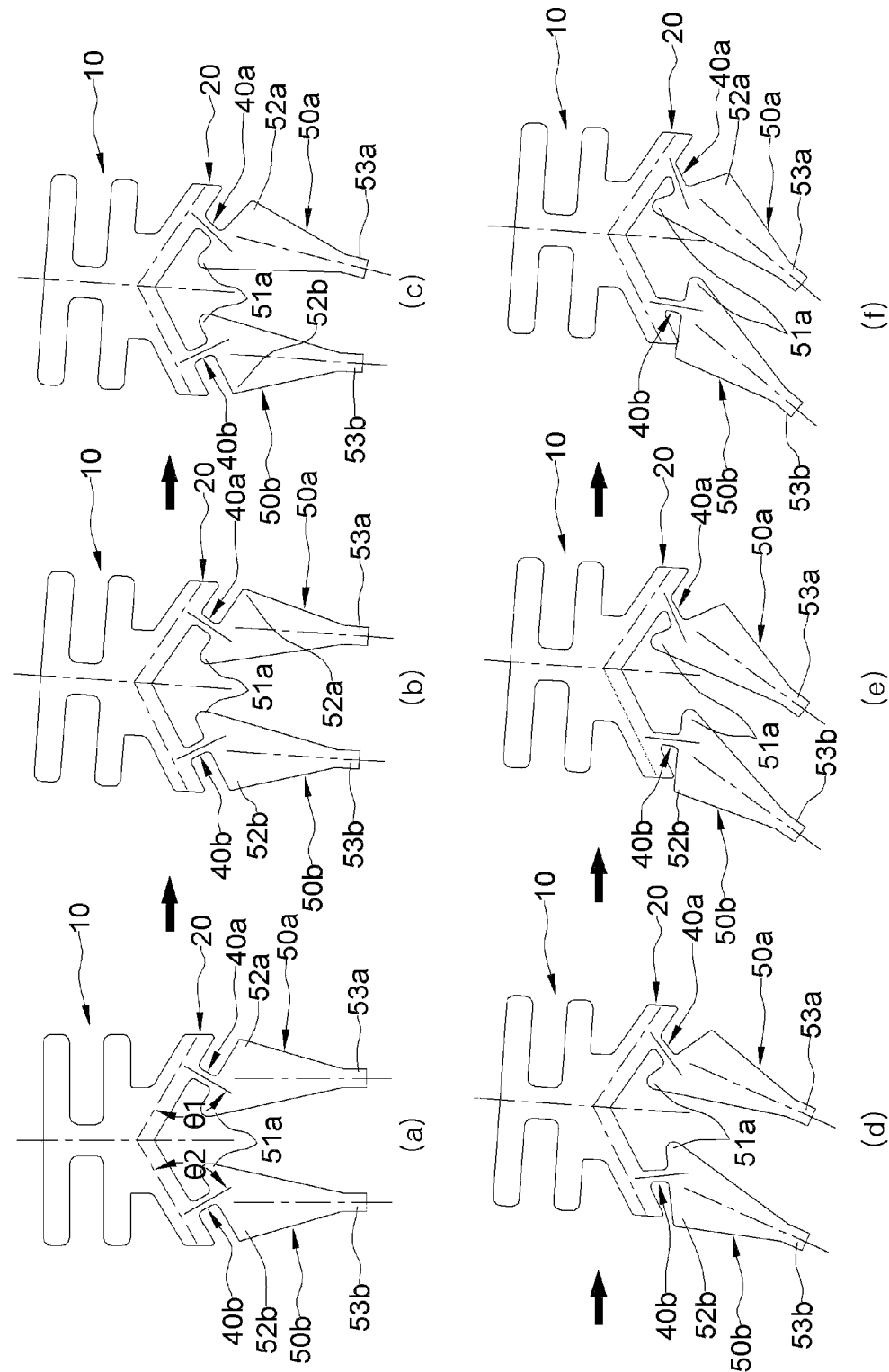
FIGS. 7a to 7f are sectional views showing sequential states wherein the vehicle wiper blade according to the fourth embodiment of the present invention wipes a window glass surface.

FIG. 7a shows an initial state before the wiper arm moves, and in this case, angles of the fixing parts 10, the first wiping part 50a and the second wiping part 50b are kept in a state of being installed vertically on the drawings. FIG. 7b shows a state wherein the wiper arm somewhat moves, and in this case, the fixing parts 10 coupled to the wiper arm and the stopping parts 20 are deformed to given angles. As the wiper arm moves, in detail, the fixing parts 10 and the stopping parts 20 are deformed to the given angles. At this time, the fixing parts 10 and the stopping parts 20 are deformed to an angle of about 4°. Since the moving distances of the first wiping part 50a and the second wiping part 50b are short, at this time, the bent parts 40 are kept perpendicular to the stopping parts 20, and the first wiping part 50a and the second wiping part 50b coming into close contact with the window glass surface are bent to the same angle as the fixing parts 10, that is, the angle of about 4°.

As the wiper arm is kept moving, as shown in FIG. 7c, the fixing parts 10 and the stopping parts 20 move in the state of being kept inclined to the angle of about 4° with respect to the wiper arm. In detail, the fixing parts 10 and the stopping parts 20 move by means of the wiper arm, and even though they rotate to a maximum rotating angle of the wiper arm, they are inclined within the angle of about 4°.

As the pressure from the wiper arm is applied to the bent parts 40, the bent parts 40 are bent together with the movement of the wiper arm. At this time, the inclined angle θ1 of the first bent part 40a is changed from an angle of 90° with respect to the stopping parts 20 to an angle of about 80°, and the inclined angle θ2 of the second bent part 40b is kept at an angle of 90° with respect to the stopping parts 20.

The first wiping part 50a is inclined to an angle of about 14° with respect to an imaginary vertical line, and the second wiping part 50b is inclined to an angle of about 4° with respect to an imaginary vertical line. In detail, the first wiping part 50a is inclined more rapidly than the second wiping part 50b by means of the pressure applied from the wiper arm.

As shown in FIG. 7d, the bent parts 20 and the wiping parts 50 are gradually inclined as the movement of the wiper arm is developed. The inclined angle θ1 of the stopping parts 20 and the first bent part 40a is about 70°, and the inclined angle θ2 of the stopping parts 20 and the second bent part 40b is about 110°. Accordingly, the first wiping part 50a and the second wiping part 50b are inclined to an angle of about 24° with respect to the imaginary vertical line.

As the wiper arm continuously moves, as shown in FIG. 7e, the inclined angle θ1 of the stopping parts 20 and the first bent part 40a is about 58°, and the inclined angle θ2 of the stopping parts 20 and the second bent part 40b is about 122°. Accordingly, the first wiping part 50a is inclined to an angle of about 32 to 35° with respect to the imaginary vertical line, and the second wiping part 50b is inclined to an angle of about 32 to 35° with respect to the imaginary vertical line. Like this, the wiping parts 50 are continuously inclined in the state where the bent parts 40 and the wiping parts 50 are inclined to the given angles.

As shown in FIG. 7f, the fixing parts 10 and the stopping parts 20 are kept inclined to the angle of about 4°, and the wiping parts 50 are kept inclined to the angle of about 32 to 35° with respect to the imaginary vertical line.

Figure 8:
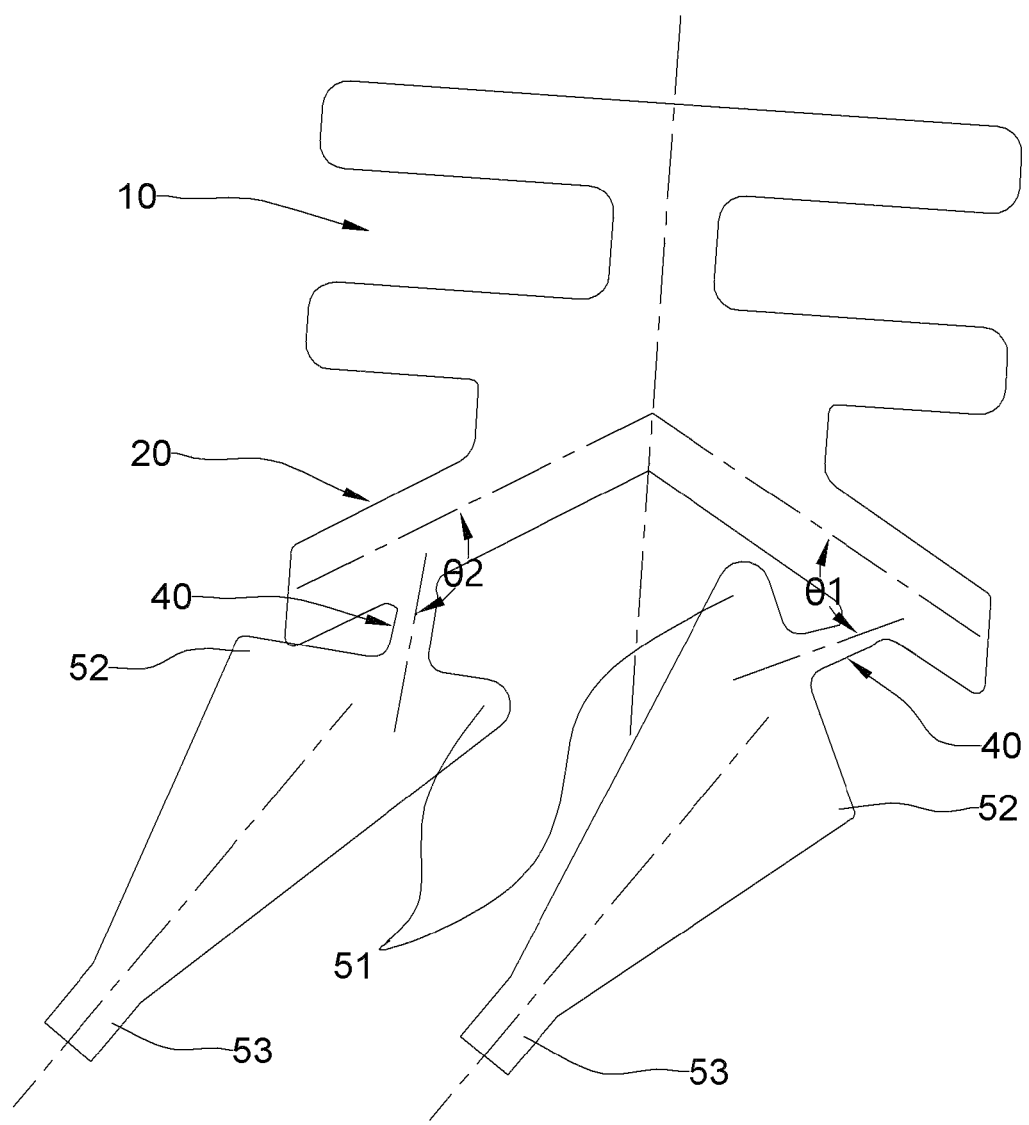
FIG. 8 is a sectional view showing a state wherein the vehicle wiper blade according to the fourth embodiment of the present invention wipes the window glass surface.

FIG. 8 is a sectional view showing a state wherein the vehicle wiper blade according to the fourth embodiment of the present invention wipes the window glass surface. As shown in FIG. 8, the first wiping part 50a is inclined to the same angle as the second wiping part 50b, but the first pressure support portion 51 of the first wiping part 50a does not come into close contact with the stopping parts 20 or the lever parts 30.

The second pressure support portion 52 of the second wiping part 50b comes into close contact with the stopping parts 20 or the lever parts 30. At this time, a pressure of about 20 to 30% of the pressure applied from the wiper arm is applied to the first wiping part 50a, and a pressure of about 70 to 80% of the pressure applied from the wiper arm is applied to the second wiping part 50b. As the bent clearance angle θ1 remains on the first bent part 40a, in detail, only the pressure caused by the elasticity of the first bent part 40a exists on the first wiping part 50a, and the second bent part 40b comes into close contact with the front end of the corresponding stopping part 20. Accordingly, the first wiping part 50a elastically comes into close contact with the window glass surface of the vehicle, so that it makes surface contact with the window glass surface with a small pressure.

The first wiping part 50a rubs against the window glass surface to remove the contaminants from the window glass surface, and the second wiping part 50b applies a high pressure to the window glass surface, so that the high pressure is applied to the second edge portion 53b to allow rainwater to be completely removed from the window glass surface.

Like this, the first edge portion 53a of the first wiping part 50a makes surface contact with the window glass surface, and the second edge portion 53b of the second wiping part 50b makes line contact with the window glass surface, thereby allowing contaminants and rainwater to be all removed from the window glass surface.

As described above, the vehicle wiper blade according to the present invention is configured to allow the wiping parts to be bent through the deformation of the bent parts formed between the stopping parts and the wiping parts and to allow the wiping parts to be deformed to the different angles from each other to cause the wiping contact parts to be deformed differently from each other, so that the wiping contact parts make surface and line contact with the window glass surface to remove contaminants from the window glass surface through the surface contact and the water from the window glass surface through the line contact.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

I claim:

1. A vehicle wiper blade having two or more edges, comprising:
    fixing parts;
    a pair of stopping parts coupled to a wiper body in such a manner as to be inclinedly branched from undersides of the fixing parts;
    bent parts disposed on undersides of the pair of stopping parts; and
    wiping parts disposed on undersides of the bent parts to wipe a window glass surface of a vehicle, wherein the bent parts and the wiping parts are left and right symmetrical with each other around a center line of the blade, each wiping part having a wiping contact part disposed on a lower end thereof in such a manner as to come into contact with the window glass surface to wipe the window glass surface, center lines of the wiping contact parts coming into contact with the window glass surface in such a manner as to be perpendicular to the window glass surface, and upper end portions of the bent parts connected to the stopping parts being inclinedly closer to an outside of the bent parts than lower end portions of the bent parts with respect to the center line of the blade to allow different pressures to be applied to the wiping parts.

2. The vehicle wiper blade according to claim 1, wherein the wiping parts comprise:
    first pressure support portions configured to be supported against inner surfaces of the stopping parts; and
    second pressure support portions configured to be supported against outer surfaces of the stopping parts, the first pressure support portions and the second pressure support portions protruding from respective wiping part in such a manner as to come into contact with the stopping parts, the first pressure support portions having shorter protruding lengths than the second pressure support portions, the second pressure support portions having longer protruding lengths than the first pressure support portions, and the bent parts are closer to front ends of the stopping parts so that the first pressure support portions and the second pressure support portions can be bent to different angles from each other.

* * * * *